US005337428A

United States Patent [19]

Krauska et al.

[11] Patent Number: 5,337,428

[45] Date of Patent: Aug. 16, 1994

[54] ADJUSTABLE BED WITH MECHANICAL JACK

[75] Inventors: Bernard J. Krauska, Stevens Point; Randy Wisniewski, Plover; Warren J. Peterson, Stevens Point, all of Wis.

[73] Assignee: Joerns Healthcare Inc., Stevens Point, Wis.

[21] Appl. No.: 961,427

[22] Filed: Oct. 15, 1992

[51] Int. Cl.[5] .................... A61C 7/00

[52] U.S. Cl. .................... 5/611; 5/11; 254/106; 254/124; 74/128

[58] Field of Search .................... 5/11, 610, 611; 254/2 B, 2 C, 8 C, 10 C, 124, 106; 74/128

[56] References Cited

U.S. PATENT DOCUMENTS

| | | | |
|---|---|---|---|
| 1,927,920 | 9/1933 | Colley . | |
| 2,174,321 | 9/1939 | Gunn . | |
| 2,185,804 | 1/1940 | Ellenberger . | |
| 2,195,094 | 3/1940 | Needham . | |
| 2,196,263 | 4/1940 | Johnston . | |
| 2,222,910 | 11/1940 | Lucker | 254/106 X |
| 2,227,397 | 12/1940 | Lucker . | |
| 2,253,417 | 8/1941 | Clark . | |
| 2,474,931 | 3/1951 | Reel et al. | 254/106 |
| 2,537,839 | 1/1951 | Lord . | |
| 2,570,360 | 10/1951 | McCarroll . | |
| 2,589,524 | 3/1952 | Zabriskie et al. . | |
| 2,716,536 | 8/1955 | Gonzales | 254/106 |
| 2,718,253 | 9/1955 | Zinke | 254/106 X |
| 2,731,842 | 1/1956 | Braselmann . | |
| 2,820,608 | 1/1958 | Braselmann . | |
| 2,823,551 | 2/1958 | Utz . | |
| 2,951,383 | 9/1960 | Herider et al. | 254/106 X |
| 2,967,589 | 1/1961 | Forbes . | |
| 3,066,914 | 12/1962 | Rousseau . | |
| 3,312,115 | 4/1967 | Braselmann . | |
| 3,733,623 | 5/1973 | Croxton . | |
| 3,920,218 | 11/1975 | Wilkerson . | |
| 4,231,124 | 11/1980 | Croxton . | |
| 4,976,483 | 12/1990 | Cunningham . | |
| 5,105,486 | 4/1992 | Peterson | 5/611 |
| 5,155,758 | 10/1952 | Vogl | 5/611 X |

FOREIGN PATENT DOCUMENTS

| | | |
|---|---|---|
| 1230459 | 6/1968 | United Kingdom . |

*Primary Examiner*—Michael F. Trettel

*Attorney, Agent, or Firm*—Price, Heneveld, Cooper, DeWitt & Litton

[57] ABSTRACT

An adjustable bed includes a base frame, a mattress frame and linkage for mounting the mattress frame for relative movement with respect to the base frame. A mechanical jack is operatively connected to the base frame and the linkage for moving the mattress frame between high and low positions. A mechanical jack includes an enclosure. A bearing supports a ram within the enclosure for extension and retraction. A drive plate and a hold plate define apertures through which the ram extends. A drive bar is shifted by rotation of an actuator shaft to lock the drive plate to the ram and extend the ram from the housing. The drive spring resiliently biases the drive plate to an unlocked or return position. A hold spring biases the hold plate to a locked position to prevent return movement of the ram into the enclosure. A release bar is shifted into engagement with the hold plate upon reverse rotation of the actuator shaft to release the plate and permit lowering of the ram into the enclosure.

58 Claims, 6 Drawing Sheets

ADJUSTABLE BED WITH MECHANICAL JACK

BACKGROUND OF THE INVENTION

The present invention relates to adjustable beds for the healthcare and home markets and, more particularly, to an adjustable bed including a mechanical jack and linkage for raising and lowering a mattress frame with respect to a base frame.

A wide variety of adjustable, multi-position beds are presently available. Such beds may be used in hospitals, nursing homes, extended care facilities and also in the home. A typical adjustable bed includes a mattress frame divided into a plurality of sections. The frame may include a head section, a seat section and a leg or foot section. The sections are positionable so that the patient or user may be moved from a flat, resting position to a raised, seated position. Typically, the sections are positioned by a motor drive, by hand operated cranks or by the user's weight.

A high/low mechanism may be included to raise the mattress frame from a lowered, rest position to a raised position for easier access to the patient by nursing or hospital personnel. A typical high/low mechanism includes a parallelogram or "X" linkage and a jack. Examples of prior adjustable beds may be found in commonly owned U.S. Pat. No. 5,105,486 entitled ADJUSTABLE BED, which issued on Apr. 21, 1992 to Peterson; U.S. Pat. No. 4,231,124 entitled HOSPITAL BEDS, which issued on Nov. 4, 1980 to Croxton and U.S. Pat. No. 3,733,623 entitled HOSPITAL BEDS, which issued on May 22, 1973 to Croxton.

Prior jacks incorporated in adjustable bed high/low mechanisms have used hydraulic piston cylinders and screw drives. In addition, mechanical jacks have been proposed which use a pair of camming or lock plates. One plate acts as a drive plate and the second plate acts as a hold plate. In the aforementioned U.S. Pat. No. 3,733,623, a hospital bed is disclosed including a mechanical jack having an enclosure or housing and a ram extending therefrom. The ram is extended by a drive plate which is moved into locking or wedged engagement with the shaft upon rotation of an actuator shaft. A hold plate is moved out of locking engagement with the ram to permit lowering of the mattress frame by rotation of a second actuator rod or shaft. A pair of raise and lower pedals, a sleeve, a lever and a cam member are provided to alternately rotate the drive shaft and the release shaft.

Prior hydraulic mechanisms have been relatively expensive when compared to the mechanical systems. Hydraulic systems are prone to leakage which causes the mattress frame to lower or sink. In addition, hydraulic systems are position sensitive. Prior mechanical systems have suffered from excessive complexity, excessive size, lack of load capacity and manufacturing difficulties. A need exists for a bed and a jack which is compact, relatively inexpensive, has sufficient load capacity and which is easily manufactured.

SUMMARY OF THE INVENTION

In accordance with the present invention, the aforementioned needs are substantially fulfilled. Essentially, a mechanical jack is provided which includes a housing and a ram assembly. The ram assembly has a ram and a bearing for supporting the ram for extension and retraction from and into the housing, a drive plate and a hold plate, each defining apertures through which the ram extends and drive means including a single actuator or pedal shaft for extending the ram and for releasing the hold plate to permit the ram to be retracted into the housing.

In narrower aspects of the invention, the ram assembly further includes a drive spring positioned between the bearing and the drive plate and a hold spring which engages the hold plate and biases it to a locking position. The housing is preferably a two-piece housing split longitudinally which permits the ram assembly to be placed therein and the housing halves joined together. The bearing includes a hub defining a bore through which the ram extends and a flange portion. After closure of the housing, the bearing may be moved inwardly to preload the drive spring. The bearing is retained in position by suitable fasteners inserted through the housing.

The drive means includes a drive bar supported within the housing for movement into engagement with a drive plate and release bar, lever or plate which may be moved into engagement with the hold plate. In one form, a sector gear is fixed to the actuator shaft. The sector gear engages a rack formed on the drive bar. The sector gear further includes a lobe which is positioned to contact the release bar.

In another form, a cam is fixed to the actuator shaft. The cam defines a rocker arm. The rocker arm and drive bar define complimentary interengaging teeth. The cam also defines a lobe positioned to engage the release bar.

In a further form, a pair of enveloping cams are provided. The cams have an involute shape where they have rolling contact with each other. One of the cams is pivoted to the housing and the remaining cam is fixed to the actuator shaft. One of the cams engages the drive bar and the other cam engages the release bar.

The lock and hold plates may be formed with generally parallel, offset portions joined by an angled portion to reduce the impingement angle of the plate and improve the load carrying capacity thereof. In another form, a plurality of relatively thin plates may be stacked one upon another to provide the necessary load carrying capacity.

The jack in accordance with the present invention permits operation with a single pedal through a single shaft. The drive plate and the hold plate may be loaded independent of each other. The bearing support allows easy assembly of the ram assembly into the housing and reduces problems heretofore associated with preloading of the drive spring. The mechanism is of reduced complexity and, hence, easier to manufacture at reduced cost when compared to prior devices. The jack is of a compact configuration for easy integration into existing adjustable beds.

DETAILED DESCRIPTION OF THE PREFERRED EMBODIMENTS

Figure 1:
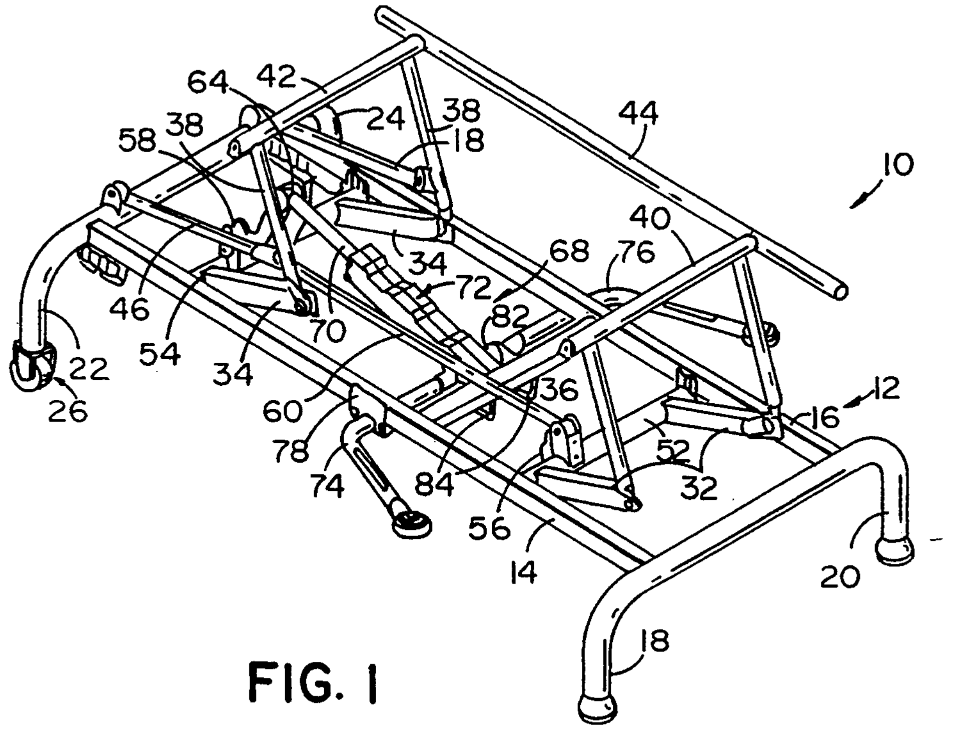
FIG. 1 is a perspective view of an adjustable bed including a mechanical jack in accordance with the present invention.

An adjustable bed in accordance with the present invention is illustrated in FIG. 1 and generally designated by the numeral 10. Bed 10 includes a base frame 12 having side rails 14, 16 and legs 18, 20, 22, 24. Casters 26 may be secured to legs 22, 24. A parallelogram linkage assembly includes lower links 32, 34 pivoted to side rails 14, 16 of base frame 12. Upper links 36, 38 are joined to upper cross members 40, 42. Cross members 40, 42 are joined to a mattress frame. For the sake of clarity, only the side rail 44 of the mattress frame is illustrated.

The linkage assembly further includes control links 46, 48, which are pivoted to the end of the base frame at the legs 22, 24 and intermediate the ends of links 38. Links 32, 34 are joined to rotatable cross pieces 52, 54. A strut 56 extends from cross piece 52 and a strut 58 extends from cross piece 54. The struts 56, 58 are interconnected by a control rod 60. A jack strut 64 is fixed to cross piece 54. A more detailed disclosure of the basic adjustable bed structure including the mattress frame may be found in the aforementioned U.S. Pat. No. 4,231,124, the disclosure of which is hereby incorporated by reference.

In accordance with the present invention, a jack assembly 68 is provided. Assembly 68 includes an extendable and retractable shaft or ram 70 and a housing 72. Shaft 70 is pivotally connected to jack strut 64. A rear end of the housing is connected to foot pedal levers 74, 76. Levers 74, 76 are supported on the base frame by brackets 78. The levers are attached to an actuator or pedal shaft 82. A bracket 84 attaches the pedal shaft to the base frame. As should be apparent, extension and retraction of ram 70 raises and lowers the mattress frame with respect to the base frame.

Figure 8:
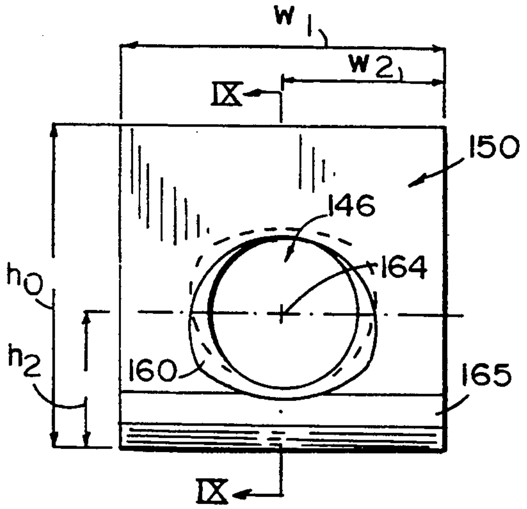
FIG. 8 is a front, elevational view of the lock and hold plate.
Figure 9:
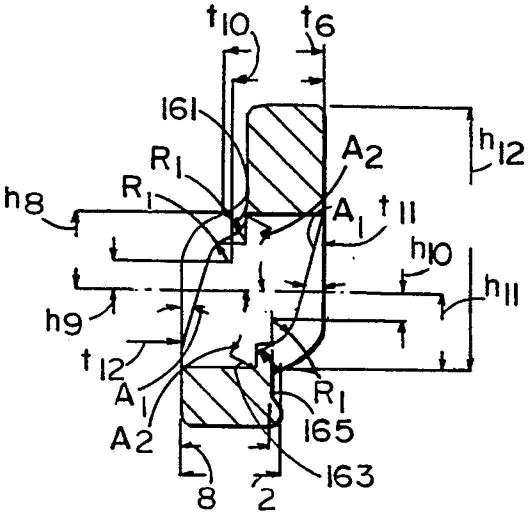
FIG. 9 is a cross-sectional view taken generally along line IX—IX of FIG. 8.
Figure 10:
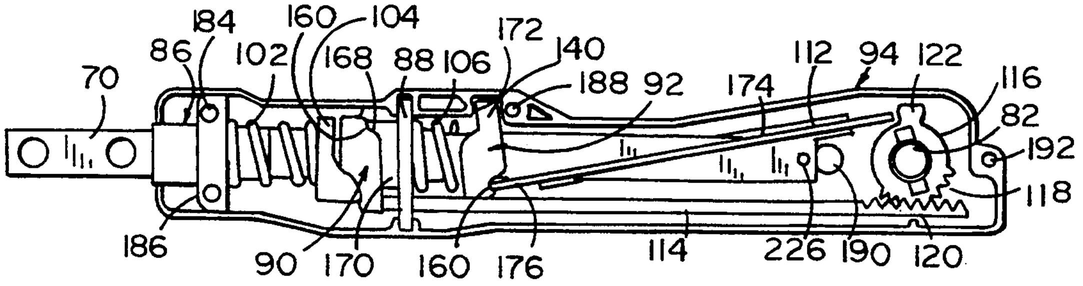
FIG. 10 is a side, elevational view of the jack with the components shown in the neutral position.

Mechanical jack assembly 68, as seen in FIGS. 2–10, includes a forward bearing support assembly 86, a mid-bearing or partition subassembly 88, a drive plate 90, a hold plate 92 and an actuator and release mechanism generally designated 94. Housing 72 is a two-piece housing split longitudinally into halves 96. As seen in FIGS. 2, 3, 4 and 10, partition subassembly 88 is initially placed on ram 70. Drive plate 90 is positioned on the shaft. A drive plate spring assembly including a coil spring 102 and a spring stop 104 are then positioned on the shaft, as shown in FIG. 10. Bearing assembly 86 is then placed on the free end of the shaft. A hold plate spring 106 is placed on the shaft on the opposite side of partition 88 and in contact with hold plate 92. Actuator and release mechanism 94 includes a generally U-shaped release plate or bar 112, a drive bar 114 and a sector gear 116. Sector gear 116 is fixed to actuator or pedal shaft 82. Gear 116 includes gear teeth 118, which mesh with a rack portion 120 defined by drive bar 114. Sector gear 116 further includes a lobe 122 dimensioned and positioned to engage release plate 112 when shaft 82 is rotated in a counterclockwise direction.

Figure 7:
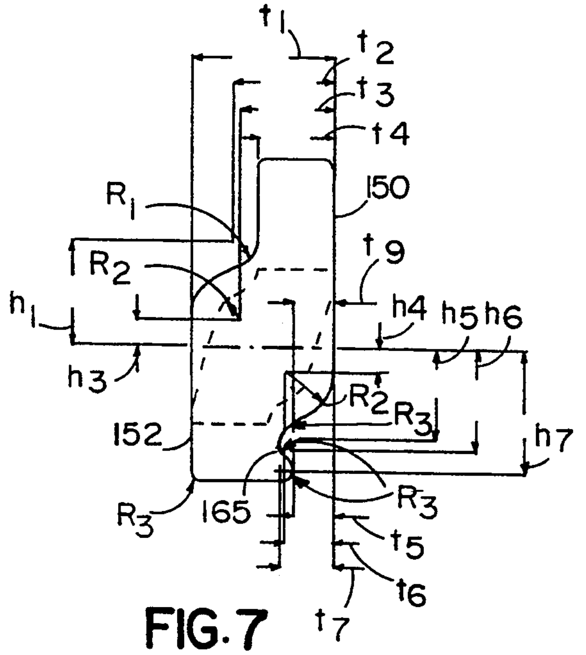
FIG. 7 is a side, elevational view of the lock and hold plate.

A presently preferred embodiment of the hold plate and the lock plate 90, 92 is illustrated in FIGS. 5–9. The plates are identical. Their orientation in the jack assembly is inverted with respect to each other. As shown, the plates include offset planar and generally parallel portions 140, 142 joined by a central, generally angled portion 144. An aperture 146 extends between a front face 150 and a rear face 152 of the plate. Aperture 146 includes chamfers 158, 160. As seen in FIG. 9, the aperture defines impingement points 161, 163. When the plate is canted with respect to rod 70, it engages and locks onto the plate at the impingement points in a known fashion. Each plate further defines a transverse groove 165 in face 150. Plates 90, 92 are cast from a suitable steel material and machined to the final configuration.

In a presently existing embodiment, each plate has an overall width $w_1$ of 1.62 inches and an overall height $h_0$ of 1.59 inches. Aperture 146 has a center point 164 located at a width $w_2$, as shown in FIG. 8, of 0.81 inches and a height $h_1$ of 0.66 inches. The plate has thickness dimensions set forth in FIGS. 7 and 9 of $t_1$ equal to 0.700 inches, $t_2$ equal to 0.495 inches, $t_3$ of 0.46 inches and $t_4$ of 0.375 inches. Groove 165 is inset from face 150 by dimensions $t_5$ of 0.197 inches, $t_6$ of 0.24 inches and $t_7$ of 0.26 inches. Groove 160 is located relative to face 152 a distance $t_8$ of 0.45 inches (FIG. 9). In addition, the aperture is defined by height dimensions $h_2$ of 0.513 inches, $h_3$ of 0.129 inches, $h_4$ of 0.129 inches, $h_5$ of 0.444 inches, $h_6$ of 0.498 inches, $h_7$ of 0.60 inches, $h_8$ of 0.30 inches, $h_9$ of 0.134 inches, $h_{10}$ of 0.134 inches, $h_{11}$ of 0.380 inches and $h_{12}$ of 1.31 inches. Additional thickness dimensions designated in FIGS. 7 and 9 are $t_9$ of 0.202 inches, $t_{10}$ of 0.450 inches, $t_{11}$ of 0.375 inches and $t_{12}$ of 0.375 inches. The aperture is defined by angles $a_1$ of 15° and $a_2$ of 30°. The various radii include $r_1$ of 0.120 inches, $r_2$ of 0.240 inches and $r_3$ of 0.06 inches.

Figure 12:
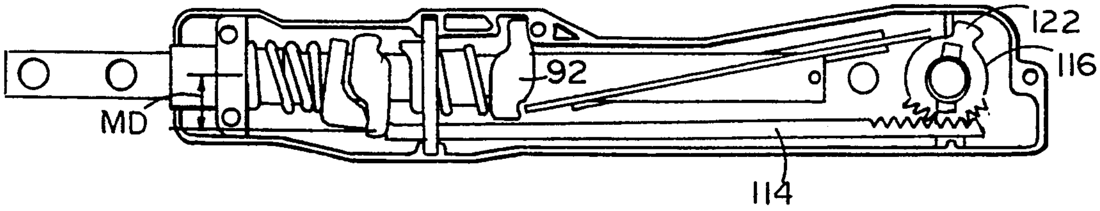
FIG. 12 is a side, elevational view of the jack with the components in the extended position.

The offsetting of the plate and, hence, the angling of aperture 146 with respect to ram 70 reduces the mounting distance, MD, of the plate/ram assembly from that which would exist if the plate were flat or not offset. The MD is the distance between the centerline of the aperture and, hence, the ram 70 to the load transfer point of the plate as shown in FIG. 12. The reduction in MD increases the load capacity of the plate for a given height dimension. The offset plate reduces the overall dimensions of the jack assembly. The offset configuration provides the desired load handling capacity in a compact unit.

Figure 23:
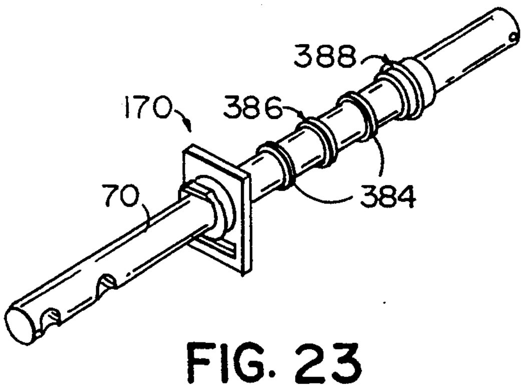
FIG. 23 is a perspective view of the presently preferred partition subassembly incorporated in the present invention.
Figure 24:
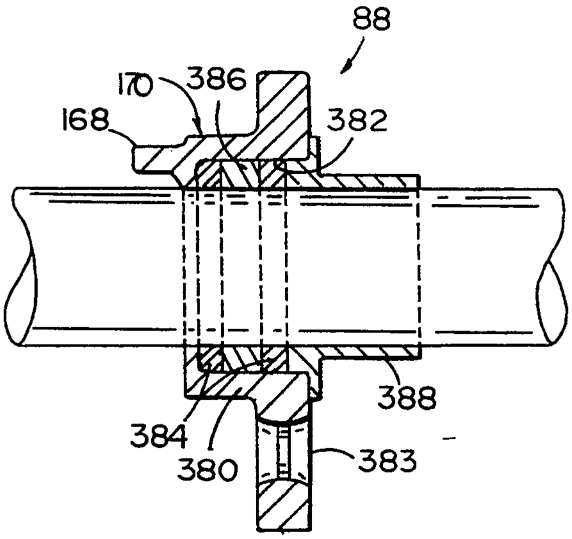
FIG. 24 is a fragmentary, enlarged, cross-sectional view of the partition subassembly.

The presently preferred embodiment of the midbearing or partition subassembly 88 is illustrated in FIGS. 23 and 24. As shown, partition subassembly 88 includes bearing plate 170. Plate 170 has a hub-like portion 380. Portion 380 defines a pivot tongue 168 and a central bore 382. In addition, plate 170 defines a passage 383 through which drive bar 114 extends. Subassembly 88 further includes a pair of annular, O-ring type seals 384 and a lubricating element or annular wicking member 386. As shown in FIGS. 23 and 24, wicking element 386 is sandwiched between seals 384 and retained within bore 382 of plate 170 by a mid-bearing sleeve 388. Element 386 is saturated with oil and may be made from felt. The seals and the wicking member are enclosed within the mid-bearing subassembly. They are retained within the assembly by a mid-bearing sleeve 388 and the force generated by hold spring 106. The wicking member 386 disperses a lubricant upon the shaft 70. The wick will absorb particles that pass upon the shaft through the wick. The wick will clean the shaft, control accumulation of particles and distribute the lubricant. The subassembly acts as a wiper element which displaces debris and as an applicator which maintains an oil coating to prevent corrosion. The seals control lubricant film thickness and help contain accumulated particles.

Figure 4:
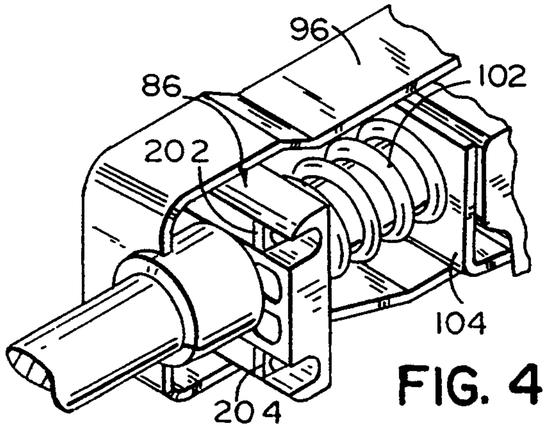
FIG. 4 is a perspective view of the bearing assembly of FIG. 3.
Figure 3:
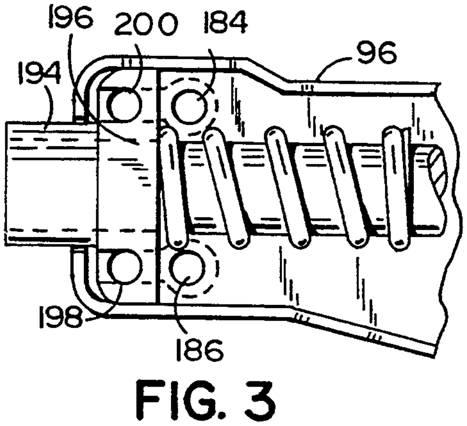
FIG. 3 is a fragmentary, side elevational view showing a bearing assembly incorporated in the mechanical jack.
Figure 5:
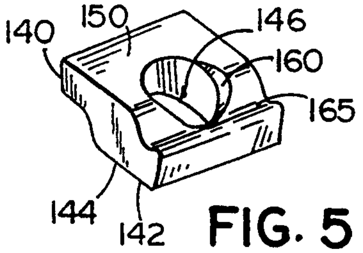
FIG. 5 is a front, perspective view of a lock and hold plate in accordance with the present invention.
Figure 6:
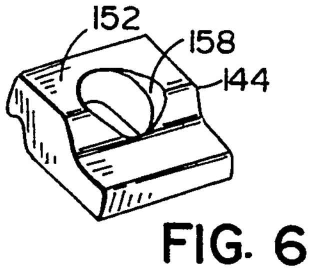
FIG. 6 is a rear, perspective view of the lock and hold plate.

The jack mechanism 68 is assembled by placing the ram, mid-bearing assembly, lock plate, hold plate, drive bar, release plate and sector gear into one of the housing halves. Plate 90 is oriented so that groove 165 is received or receives a tongue 168 defined by a pivot plate 170. Plate 170 is formed as part of or positioned against partition subassembly 88. Hold plate 92 is positioned in an inverted or flipped orientation from plate 90. Offset portion 140 is positioned within a pivot groove 172 defined by each housing half 96. Release plate 112 is positioned within a side guide track 174 defined on an inner surface of each housing half. An end 176 is received within groove 165 of plate 92. The front of each half 96 defines a ram aperture 182. The housing halves 96 further define apertures 184, 186, 188, 190 and 192. The housing halves are closed and bolted together with suitable fasteners passing through apertures 186 and 192. The bearing support 86, as best seen in FIGS. 3 and 4, defines a central hub portion 194 and a generally rectangular flange 196. A front face of flange 196 defines grooves 198, 200. Aperture plate portions 202, 204 are positioned within the grooves. As can be seen from FIGS. 3, 4 and 10, after the components are positioned within the housing, the bearing assembly can be moved rearwardly compressing drive spring 102. The grooves and aperture plates of the flange portion 196 are aligned with fastener apertures 184, 186. Suitable bolts are passed between both sides of the housing through the aperture to secure the bearing assembly in place. The front bearing assembly and the split housing allow for easy assembly of the jack components and safety in preloading of the springs incorporated therein.

Figure 2:
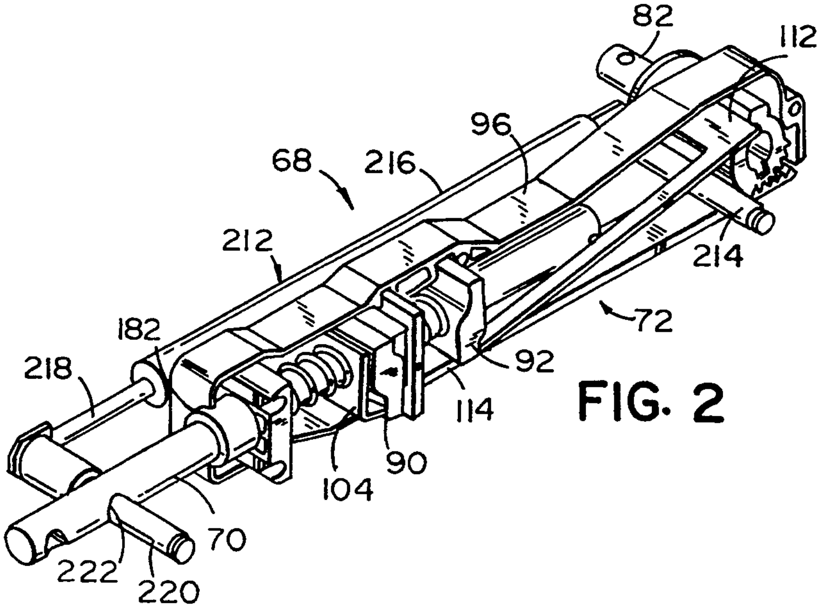
FIG. 2 is an enlarged, perspective view of a mechanical jack in accordance with the present invention.

In the preferred form, shown in FIG. 2, at least one gas spring damper 212 is positioned between housing 72 and ram 70. As shown, a mounting shaft 214 can extend through apertures 190 in the halves 96 of the housing. A cylinder 216 of gas spring 212 is secured to shaft 214. The piston rod 218 of the spring is attached to ram 70 at a transverse rod 220 which extends through an aperture 222 at the free end of rod 70. The gas springs, as is known in the art, will control descent of the mattress frame relative to the base frame when the mechanical jack is released. It is presently preferred that a pair of springs be employed with one mounted on each side of the housing 72. In the alternative, the gas springs could be attached directly between the base frame and the mattress frame of the adjustable bed.

OPERATION

Figure 11:
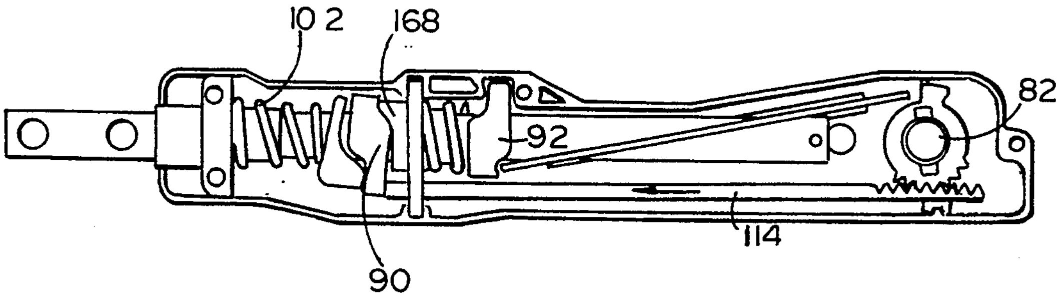
FIG. 11 is a side, elevational view of the jack with the components in the pre-extend position.

In view of the above description, the operation of the jack in accordance with the present invention should now be apparent. The drive plate and hold plate act to lock on the shaft or ram in a unidirectional manner. Hold plate 92 locks or engages shaft 70 when the shaft moves inwardly or retracts into the housing. The plate is maintained in its locked position by spring 106. When in the neutral position shown in FIG. 10, plate 90 is not angled and the plate is free on the shaft. In the pre-extend mode or position illustrated in FIG. 11, one of the pedal levers 74, 76 has been moved downwardly rotating shaft 82 in a clockwise direction when viewed in FIG. 11. Sector gear 118, engaging rack 120, shifts drive bar 114 to the left when viewed in FIG. 11. This cants lock plate 90 on its pivot point defined by tongue 168. Plate 90 is locked into engagement with the shaft. The plate is canted against the bias, of drive spring 102. As sector gear 116 rotates further in a clockwise direction as shown in FIG. 12, plate 90 shifts to the left along with ram 70 since it is locked on the ram. At this point, hold plate 92 remains free on the shaft.

When pressure on pedal 74, 76 is released, drive spring 102 moves lock plate 90 back into engagement with plate 170. Bar 114 shifts shaft 82 to its start position raising the pedal lever. Retraction of ram 70 into the housing is prevented by hold plate 92 which now locks on and engages the ram. The plates are one way acting devices. Drive plate 90, therefore, pushes the ram or shaft 70 outwardly with each pedal stroke. A stop pin 226 positioned in ram 70 limits outward movement of the ram with respect to the housing.

Figure 13:
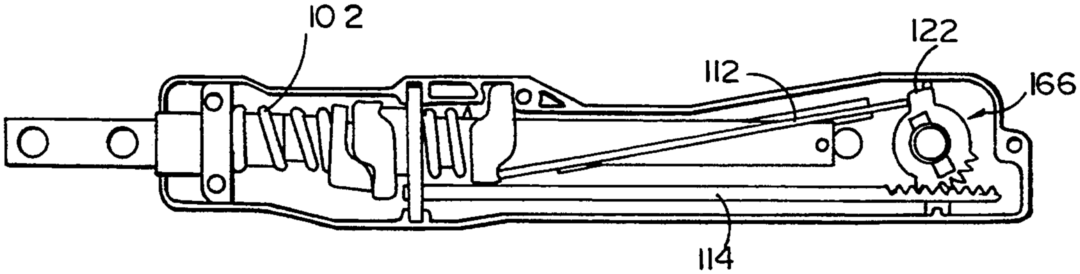
FIG. 13 is a side, elevational view of the jack with the components in the release position.

In the release mode, as shown in FIG. 13, one of the pedal levers is rotated in a reverse or upward direction causing the gear sector 116 to rotate in a counterclockwise direction as shown. Drive bar 114 is retracted or moved to the right as shown in FIG. 13. Lobe 122 on sector gear 116 is moved into engagement with release plate 112. Release plate end 176 engages hold plate 92 at groove 165 canting the plate relative to its pivot groove. This positions the aperture so that ram 70 is released and the ram is allowed to return to a retracted position within the housing. Lowering of the mattress frame with respect to the base frame is controlled by the gas springs, as set forth above.

The mechanical jack and adjustable bed in accordance with the present invention incorporates only a single pedal or actuator shaft. The same pedal may be depressed to extend the ram. Lifting of the pedal allows the jack to collapse. The drive plate 90 is loaded by spring 102. This loading is independent of loading of the hold plate 92, which is loaded by spring 106. The front bearing assembly simplifies assembly of the jack mechanism and provides a reasonably safe way to preload the springs. The jack assembly is of significantly reduced complexity from mechanical jacks heretofore provided. A reduction in overall weight and size is also accomplished. The reduction in dimensions is accomplished at least in part through the configuration of the lock and hold plates in the preferred embodiment.

ALTERNATIVE EMBODIMENTS

Figure 14:
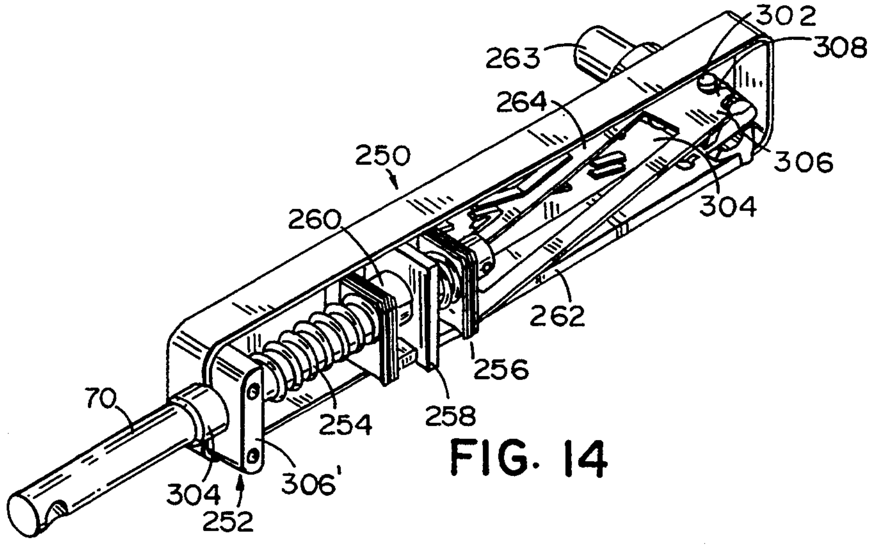
FIG. 14 is a perspective view of an alternative embodiment of the mechanical jack in accordance with the present invention.
Figure 15:
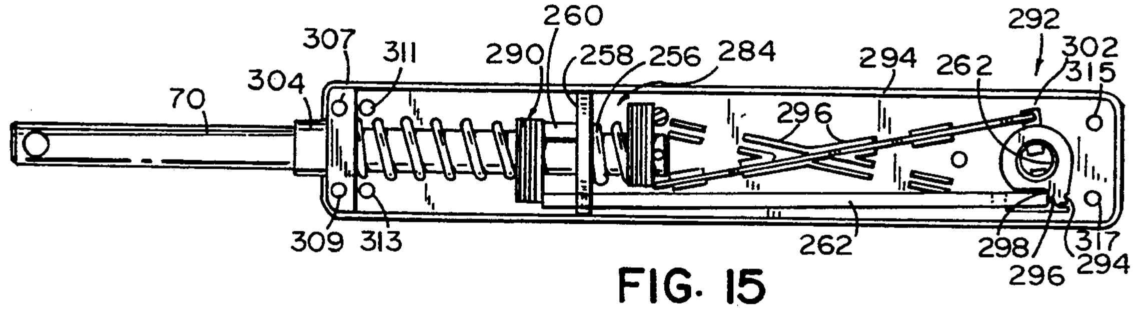
FIG. 15 is a side, elevational view of the jack of FIG. 14.
Figure 16:
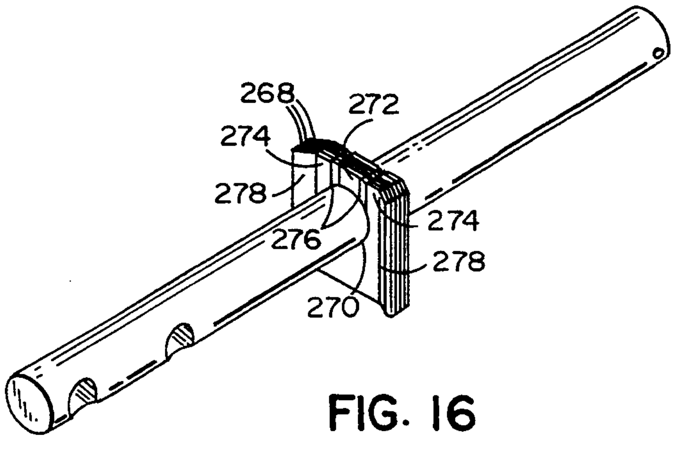
FIG. 16 is a perspective view of a ram and a plurality of lock plates incorporated in the jack of FIG. 14.

An alternative embodiment of a mechanical jack in accordance with the present invention is illustrated in FIGS. 14, 15 and 16 and generally designated by the numeral 250. The jack includes a ram 70, a bearing assembly 252, a drive spring 254, a release spring 256, a partition 258, a pivot spacer 260, a drive bar 262, a release plate 264 and a pedal or actuator shaft 263. Instead of the offset plates 90, 92, the lock and hold plate structure is formed by a plurality of stacked thin plates 268. The thin plates define a central aperture 270, a central, generally planar portion 272 and intermediate portions 274. Portion 272 is joined to portions 274 by angled portions 276. In addition, each lateral plate includes an outer, angled lateral portion 278. The configuration of the plates positions them in a stacked relationship and provides a mutually cooperative guide arrangement during operation. A hold plate assembly or plate stack 284 pivots against a fastener and fastener boss 286. Drive bar 262 extends through an aperture and partition 258 and into contact with a lower edge of a drive plate stack 290. Stack 290 pivots against spacer 260.

A rocker arm gear actuator mechanism 292 is positioned on actuator shaft 263. Mechanism 292 includes an arm 294 defining teeth 296. The teeth cooperate with and engage complimentary teeth 298 formed on an end of the drive bar. The rocker arm actuator 292 further includes a radially directed post or lobe 302. The lobe is positioned to engage release plate 264. Plate 264 has a generally rectangular configuration including a central aperture 304. An end 306 defines a semicircular groove or slot 308 dimensioned to receive lobe 302. Each housing half 294 defines guide tracks 296 for receipt of release plate 264.

Bearing assembly 252 includes a hub 304 and a flange 306'. Flange 306' defines apertures 307, 309 which are alignable with housing apertures 311, 313. The housing halves also define fastener apertures 315, 317.

The operation of the embodiment of FIGS. 14–16 is substantially identical to that of the above described embodiment. Clockwise rotation of shaft 263 causes rocker arm portion 294 to engage teeth 296 of drive bar 262. The bar is moved to the left, when viewed in FIG. 15, canting the plates of stack 290 and locking them on ram 70. Ram 70 is extended to the fully extended position upon multiple strokes of the pedal. Counterclockwise rotation of the rocker arm gear moves pin 302 into engagement with release plate 264. This moves the release plate stack 284 out of engagement with ram 70, permitting the ram to retract into the housing. Bearing assembly 252 permits preloading of the drive spring 254 in the same fashion as assembly 86.

Figure 17:
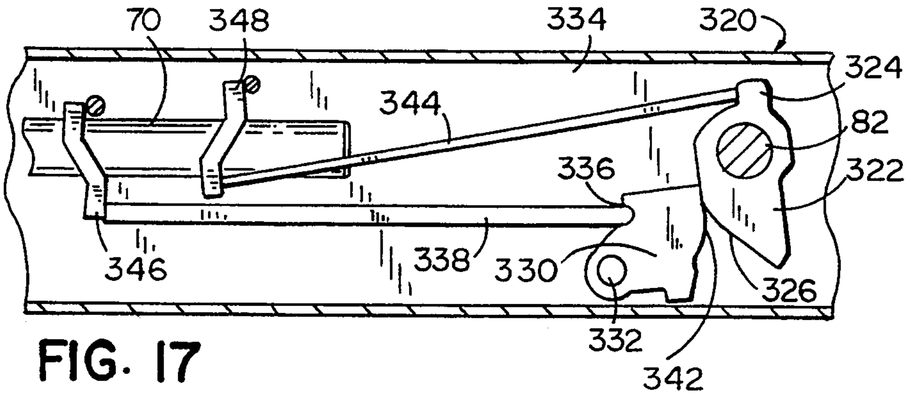
FIG. 17 is a fragmentary, side elevational view of an alternative actuator means in accordance with the present invention.
Figure 18:
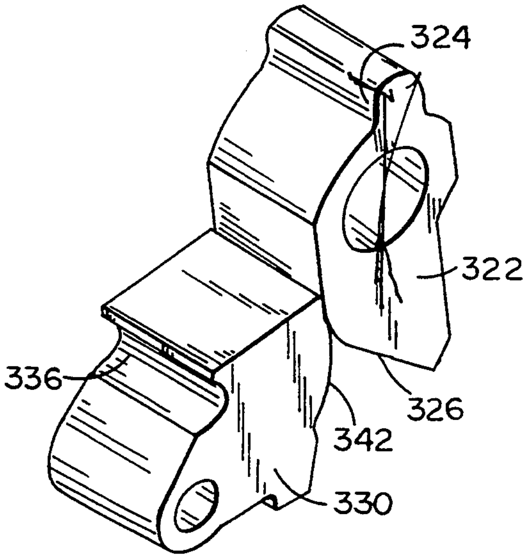
FIG. 18 is an enlarged, perspective view of the cams incorporated in the actuator mechanism of FIG. 17.
Figure 19:
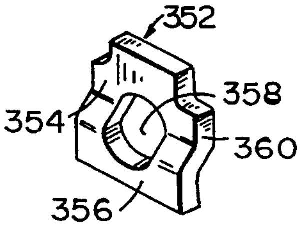
FIG. 19 is a perspective view of an alternative lock and hold plate in accordance with the present invention.
Figure 20:
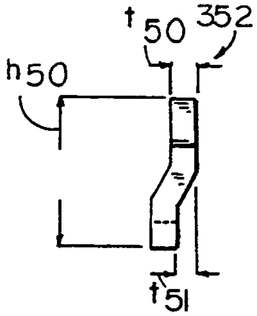
FIG. 20 is a side, elevational view of the plate of FIG. 19.

A still further alternative design for the actuator and release mechanism is illustrated in FIGS. 17 and 18 and generally designated 320. Mechanism 320 includes a first cam 322 having a lobe 324 and a surface 326. Cam 322 is fixed to pedal shaft 82. A second cam 330 is pivoted to a support shaft 332 extending between housing sides 334. Cam 330 defines a generally U-shaped groove 336 which receives an end of the drive bar or rod 338. Cam 330 defines a surface 342. The cams contact each other at surfaces 326, 342. The cams are enveloping and have an involute shape where they make rolling contact with each other. As should be apparent from FIGS. 17 and 18, rotation of shaft 82 in a clockwise direction causes cam 330 to rotate in a counterclockwise direction driving the drive bar 338. Rotation of shaft 82 in a counterclockwise direction moves lobe 324 into contact with the release plate 344. Bar 338 engages drive plate 346. Release plate 344 engages hold plate 348. The two cam system, therefore, provides lifting or extension action by the secondary cam 330 and release by the primary cam 322. The secondary cam 330 abuts the primary cam during the release mode. This prevents the drive bar from becoming loose in the system. A preload is maintained on the lift plate 346.

Figure 21:
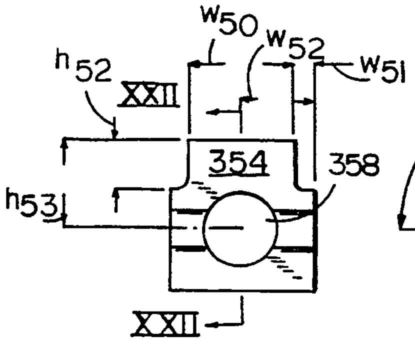
FIG. 21 is a front, elevational view thereof.
Figure 22:
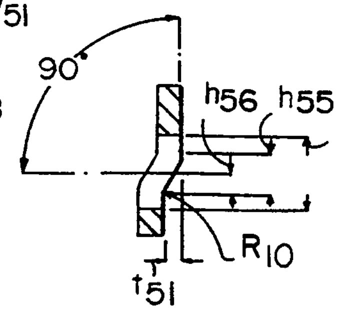
FIG. 22 is a cross-sectional view taken generally along line XXII—XXII of FIG. 21.

An alternative configuration for the lift and hold plates is illustrated in FIGS. 19–22. The plate designated 352 is of an offset configuration including a first, generally planar portion 354 and a second, generally parallel planar portion 356. An aperture 358 is defined by a central portion 360. The aperture extends through the central portion and also partially through offset portions 354, 356. Plate 352 can be produced by a metal stamping process which reduces manufacturing costs. The plate includes the offset configuration to minimize the impingement angle. In an existing embodiment, plate 352 has a thickness $t_{50}$ of 0.25 inches, an offset $t_{51}$ of 0.19 inches and an overall height $h_{50}$ of 1.55 inches. As shown in FIG. 21, portion 354 has a width $w_{50}$ of 1.1 inches. Lateral edges of portion 354 are inset a distance $w_{51}$ of 0.20 inches. The width $w_{52}$ from a lateral edge of the plate to the aperture center is 0.750 inches. Portion 354 has a height $h_{52}$ of 0.50 inches. Aperture 358 has a center point located a distance or height $h_{53}$ of 0.9 inches from the upper lateral edge of portion 350. Aperture 358 has an overall height $h_{54}$ of approximately 0.758 to 0.762 inches. The height dimension $h_{55}$ between portions 354, 356 is 0.4 inches. The center point of aperture 358 is located a height $h_{56}$ of 0.2 inches from the upper lateral edge of planar portion 356. Intermediate portion 360 joins the planar portion 354, 356 along a radius $r_{10}$ of 0.05 inches.

Figure 25:
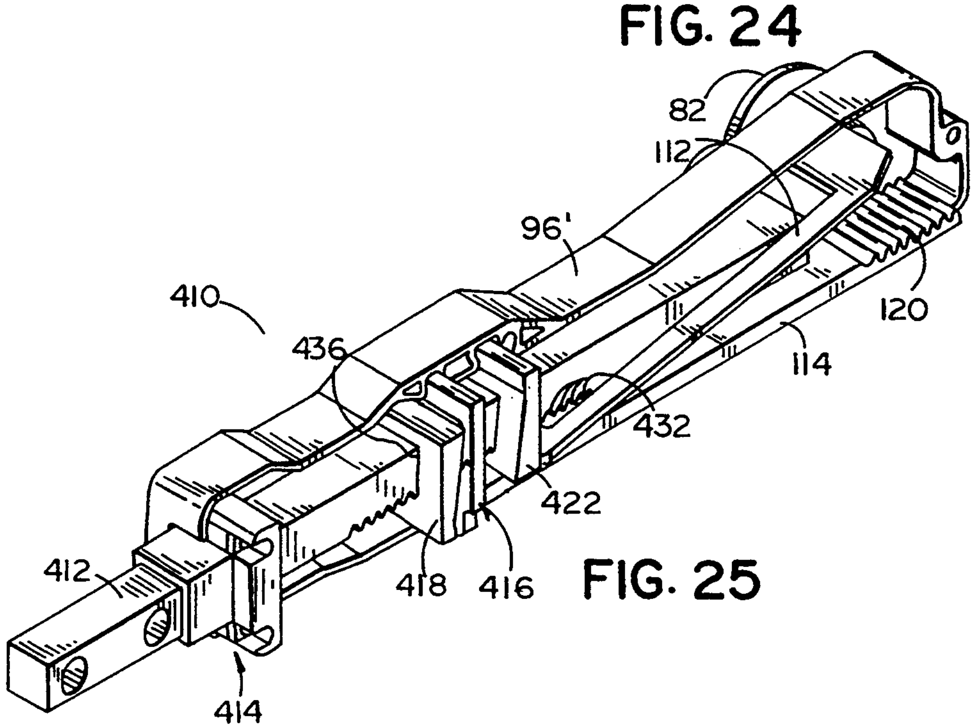
FIG. 25 is a perspective view of a still further alternative embodiment of the mechanical jack in accordance with the present invention.
Figure 26:
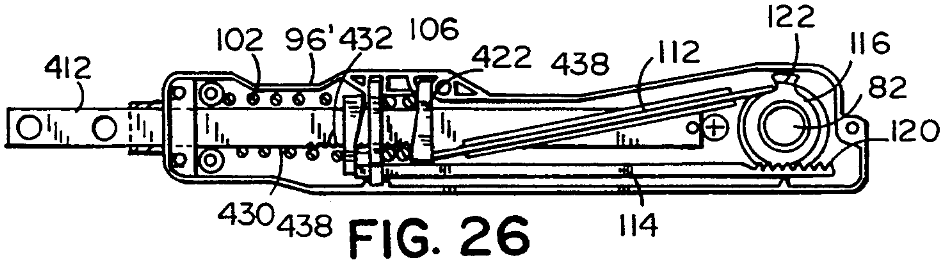
FIG. 26 is a side, elevational view of the mechanical jack of FIG. 25.

Another alternative embodiment of a mechanical jack in accordance with the present invention is illustrated in FIGS. 25 and 26 and generally designated by the numeral 410. Embodiment 410 includes a housing defined by housing halves 96', a ram or shaft 412 having a generally rectangular or square configuration in cross section. A forward bearing assembly 414, a mid-bearing or partition subassembly 416, a drive plate 418, a hold plate 422 and an actuator and release mechanism. The actuator and release mechanism includes a drive shaft 82, sector gear 116, release bar 112 and drive bar 114. Embodiment 410 also includes a drive spring 102 and a hold spring 106.

Jack 410 has a positive engaging actuator as opposed to the smooth shaft version illustrated in FIG. 2. Ram 412 includes an undersurface 430 which defines ratchet teeth 432 along a substantial portion of the length of the shaft. The teeth extend along the entire full stroke length of the shaft. Drive plate 418 and hold plate 422 each define a rectangular bore 436. As shown in FIG. 26, aperture 436 has a truncated configuration in side elevation and defines an impingement edge 438. The plates are identical but are reversed in their orientation within housing halves 96'. Impingement edges 438 engage the ratchet teeth or rack structure 432 defined by the shaft in a positive fashion.

The remaining portions of the embodiment 410 are substantially the same as the smooth shaft embodiment. The principal difference, of course, being that bearing subassemblies 414, 416 define rectangular bores or square bores as opposed to the circular bores of the prior embodiments.

In operation, rotation of sector gear 116 moves drive plate 114 into engagement with drive plate 418. Plate 418 positively engages the ratchet teeth 432 after it moves against the return or drive spring force. The hold plate allows the shaft to translate while the shaft is being extended. As drive bar 114 is returned to its initial position, hold plate 422 engages the ratchet teeth 432 at its impingement edge 438 in a positive manner.

Opposite rotation of shaft 82 moves release bar 112 into engagement with the hold plate 422. Hold plate 422 is then pivoted out of engagement with the shaft 412. The shaft is permitted to retract into the housing. Drive plate 418 does not engage the ram or shaft 412 when spring 102 is holding plate 418 at the rest position.

The adjustable bed and mechanical jack in accordance with the present invention are of significantly reduced complexity from that heretofore provided. The configuration of the lock and hold plate structure and the housing increase the load carrying capacity and reduce the overall dimensions of the jack from those heretofore provided. A single pedal and pedal or actuator shaft extend and retract the ram. The split housing and the bearing assembly increase the ease of manufacture and insure safe preloading of the jack springs. The dampers for the high/low mechanism may be mounted directly to the housing and ram. A self-contained package may, therefore, be provided which simplifies installation. The configuration of the lock and hold plates insures reliable gripping of the ram and permits easy release for retraction purposes. Lost dimensional features of the impingement areas of the plates due to wear is minimized. The ram extends with each pedal stroke. The ram holds its position when the pedal is released. The load is released simply by lifting the pedal and rotating the shaft in a direction opposite the lift direction.

In view of the above description, those of ordinary skill in the art may envision various modifications which would not depart from the inventive concepts disclosed herein. The above description should, therefore, be considered as only that of the preferred embodiments. The true spirit and scope of the present invention may be determined by reference to the attached claims.

The embodiments of the invention in which an exclusive property or privilege is claimed are defined as follows:

1. A mechanical jack for use in an adjustable bed, said jack comprising:

an elongated housing having a forward end and a rearward end;

a transverse partition within said housing intermediate the ends thereof;

a bearing assembly within said housing adjacent the forward end;

an elongated ram extending from said housing, said ram being supported by said bearing assembly and partition;

a drive plate defining a drive aperture through which said ram extends, said drive plate being between said partition and said bearing assembly;

drive plate spring means within said housing and engaging said drive plate for resiliently biasing said drive plate towards said partition;

a hold plate defining a hold aperture through which said ram extends;

an actuator shaft rotatably mounted on said housing; and drive and release means operatively connected to said actuator shaft for engaging and shifting said drive plate to extend said ram from said housing with said hold plate holding said ram in position when said shaft is rotated in a first direction and for engaging said hold plate to release said ram permitting it to retract into the housing when said shaft is rotated in a second direction.

2. A mechanical jack as defined by claim 1 wherein said bearing assembly includes a hub portion which defines a ram bore and a flange portion having a front surface and a rear surface, said drive plate spring engaging said rear surface.

3. A mechanical jack as defined by claim 2 further including fastener means on said housing and engaging the front surface of said flange to retain the bearing assembly in position and preload said drive plate spring.

4. A mechanical jack as defined by claim 1 wherein said drive plate and said hold plate each include offset, generally parallel portions joined by an angled portion, said apertures opening through said angled portion and partially through said offset portion.

5. A mechanical jack as defined by claim 4 further including a hold plate spring disposed between and engaging said partition and said hold plate to bias said hold plate to a ram engaging position.

6. A mechanical jack as defined by claim 1 wherein said drive and release means comprises:

an elongated drive bar supported within said housing for reciprocating movement;

a release bar supported within said housing for reciprocating movement; and actuator means on said actuator shaft for shifting said drive bar to move said drive plate when the shaft is rotated in the first direction and for shifting said release bar into engagement with the hold plate when said shaft is rotated in the second direction.

7. A mechanical jack as defined by claim 6 wherein said actuator means comprises:

a sector gear fixed to said actuator shaft; and a rack joined to said drive bar and engaged by said sector gear.

8. A mechanical jack as defined by claim 7 wherein said actuator means further includes a lobe on said sector gear positioned to engage said release bar.

9. A mechanical jack as defined by claim 8 wherein said drive plate and said hold plate each include offset, generally parallel portions joined by an angled portion, said apertures opening through said angled portion and partially through said offset portions, said plates defining an impingement angle.

10. A mechanical jack as defined by claim 9 further including a hold plate spring disposed between and engaging said partition and said hold plate to bias said hold plate to a ram engaging position.

11. A mechanical jack as defined by claim 10 wherein said bearing assembly includes a hub portion which defines a ram bore and a flange portion having a front surface and a rear surface, said drive plate spring engaging said rear surface.

12. A mechanical jack as defined by claim 11 further including fastener means on said housing and engaging the front surface of said flange to retain the bearing assembly in position and preload said drive plate spring.

13. A mechanical jack as defined by claim 1 wherein said lock plate comprises a first stack of a plurality of thin plates having flat central portions, each plate defining a generally circular aperture and each plate includes inwardly angled lateral edge portions.

14. A mechanical jack as defined by claim 13 wherein said hold plate comprises a second stack of a plurality of thin plates, each plate defining a generally circular aperture and each plate including inwardly angled lateral edge portions.

15. A mechanical jack as defined by claim 14 wherein said bearing assembly includes a hub portion which defines a ram bore and a flange portion having a front surface and a rear surface, said drive plate spring engaging said rear surface.

16. A mechanical jack as defined by claim 15 further including fastener means on said housing and engaging the front surface of said flange to retain the bearing assembly in position and preload said drive plate spring.

17. A mechanical jack as defined by claim 6 wherein said actuator means comprises:

a cam fixed to said shaft and defining a lobe and a rocker arm, said lobe positioned to engage said release bar, said rocker arm defining a plurality of teeth, said teeth dimensioned and positioned to engage a plurality of complimentary teeth on said drive bar.

18. A mechanical jack as defined by claim 17 wherein said bearing assembly includes a hub portion which defines a ram bore and a flange portion having a front surface and a rear surface, said drive plate spring engaging said rear surface.

19. A mechanical jack as defined by claim 18 further including fastener means on said housing and engaging the front surface of said flange to retain the bearing assembly in position and preload said drive plate spring.

20. A mechanical jack as defined by claim 19 wherein said drive plate and said hold plate each include offset, generally parallel portions joined by an angled portion, said apertures opening through said angled portion and partially through said offset portions.

21. A mechanical jack as defined by claim 20 further including a hold plate spring disposed between and engaging said partition and said hold plate to bias said hold plate to a ram engaging position.

22. A mechanical jack as defined by claim 17 wherein said lock plate comprises a first stack of a plurality of thin plates, each plate defining a generally circular aperture and each plate including inwardly angled lateral edge portions and a generally flat central portion.

23. A mechanical jack as defined by claim 22 wherein said hold plate comprises a second stack of a plurality of thin plates, each plate defining a generally circular aperture and each plate including inwardly angled lateral edge portions and a generally flat central portion.

24. A mechanical jack as defined by claim 23 wherein said bearing assembly includes a hub portion which defines a ram bore and a flange portion having a front surface and a rear surface, said drive plate spring engaging said rear surface.

25. A mechanical jack as defined by claim 24 further including fastener means on said housing and engaging the front surface of said flange to retain the bearing assembly in position and preload said drive plate spring.

26. A mechanical jack as defined by claim 6 wherein said actuator means comprises:

a pair of cams having contacting, involute surfaces, one of said cams being pivoted to said housing and having a lobe engaging said drive bar, the other of said cams being fixed to said actuator shaft and having a lobe positioned to engage said release bar.

27. A mechanical jack as defined by claim 26 wherein said drive plate and said hold plate each include offset, generally parallel portions joined by an angled portion, said apertures opening through said angled portion and partially through said offset portions, said plates defining an impingement angle.

28. A mechanical jack as defined by claim 27 further including a hold plate spring disposed between and engaging said partition and said hold plate to bias said hold plate to a ram engaging position.

29. A mechanical jack as defined by claim 28 wherein said bearing assembly includes a hub portion which defines a ram bore and a flange portion having a front surface and a rear surface, said drive plate spring engaging said rear surface.

30. A mechanical jack as defined by claim 29 further including fastener means on said housing and engaging the front surface of said flange to retain the bearing assembly in position and preload said drive plate spring.

31. A mechanical jack as defined by claim 1 wherein said partition comprises:

a partition plate defining a bore; and wiper means received by said partition plate for wiping debris from the ram and lubricating the ram to prevent corrosion.

32. A mechanical jack as defined by claim 31 wherein said wiper means comprises:

an annular wick member, said member being saturated with a lubricant.

33. A mechanical jack as defined by claim 32 wherein said wiper means further includes:

a pair of annular seals sandwiching said wick member; and a sleeve engaging said partition plate and retaining said seals and wick member within said partition plate bore.

34. A mechanical jack as defined by claim 1 wherein said ram defines a ratchet surface including a plurality of teeth.

35. A mechanical jack as defined by claim 34 wherein said drive plate and said hold plate define a truncated bore having an impingement edge moveable into and out of engagement with said ratchet surface to engage the ram in a positive fashion.

36. A mechanical jack as defined by claim 35 wherein said drive and release means comprises:

an elongated drive bar supported within said housing for reciprocating movement;

a release bar supported within said housing for reciprocating movement; and actuator means on said actuator shaft for shifting said drive bar to move said drive plate when the shaft is rotated in the first direction and for shifting said release bar into engagement with the hold plate when said shaft is rotated in the second direction.

37. A mechanical jack as defined by claim 36 wherein said actuator means comprises:

a sector gear fixed to said actuator shaft; and a rack joined to said drive bar and engaged by said sector gear.

38. A mechanical jack as defined by claim 37 wherein said bearing assembly includes a hub portion which defines a ram bore and a flange portion having a front surface and a rear surface, said drive plate spring engaging said rear surface.

39. An adjustable bed, comprising:

a base frame;

a mattress frame;

linkage means operatively connected to said frames for mounting the mattress frame on said base frame; and a mechanical jack connected to said base frame and said linkage means for raising and lowering said mattress frame with respect to said base frame, said jack comprising:

an enclosure defining a ram aperture;

a ram extending through said ram aperture;

a bearing support disposed within said enclosure for supporting said ram for extension from and retraction into said enclosure;

a drive plate;

a hold plate, said plates defining plate apertures through which said ram extends; and drive means within said enclosure for canting said drive plate into locking engagement with said ram and shifting said drive plate to extend said ram from said enclosure with said hold plate preventing return movement of said ram and for canting said hold plate out of engagement with said ram to release the ram and permit the mattress frame to be lowered, said drive means including a single shaft which is rotated in a first direction to extend said ram and in a second direction to release said ram, a drive bar supported within said housing for reciprocating movement, a release bar supported within said housing for reciprocating movement, and actuation means on said actuator shaft for shifting said drive bar and moving said drive plate when the shaft is rotated in the first direction and for shifting said release bar into engagement with the hold plate when said shaft is rotated in the second direction.

40. An adjustable bed as defined by claim 39 wherein said ram defines a ratchet surface including a plurality of teeth.

41. An adjustable bed as defined by claim 40 wherein said drive plate and said hold plate define a truncated bore having an impingement edge moveable into and out of engagement with said ratchet surface to engage the ram in a positive fashion.

42. An adjustable bed, comprising:

a base frame;

a mattress frame;

linkage means operatively connected to said frames for mounting the mattress frame on said base frame; and a mechanical jack connected to said base frame and said linkage means for raising and lowering said mattress frame with respect to said base frame, said jack comprising:

an enclosure defining a ram aperture;

a ram extending through said ram aperture;

a bearing support disposed within said enclosure for supporting said ram for extension from and retraction into said enclosure;

a drive plate;

a hold plate, said plates defining plate apertures through which said ram extends;

drive means within said enclosure for canting said drive plate into locking engagement with said ram and shifting said drive plate to extend said ram from said enclosure with said hold plate preventing return movement of said ram and for canting said hold plate out of engagement with said ram to release the ram and permit the mattress frame to be lowered, said drive means including a single shaft which is rotated in one direction to extend said ram and in another direction to release said ram, and wherein said jack further comprises:

a partition member disposed within said enclosure and supporting said ram;

a drive spring engaging said drive plate and urging said drive plate towards said partition and hence out of locking engagement with said ram; and a hold spring between said partition and said hold plate for urging said hold plate away from said partition and into locking engagement with said ram upon inward movement of said ram.

43. An adjustable bed as defined by claim 42 wherein said bearing support is positioned between said ram aperture and said drive spring and said jack further includes a fastener engaging said bearing support and holding same in position with the bearing support preloading said drive spring.

44. An adjustable bed as defined by claim 43 wherein said enclosure is a two-piece housing, split longitudinally so that said bearing support, said partition, said springs and said plates may be positioned on said ram, placed within one piece of the housing, the housing pieces joined and the bearing support can be shifted inwardly and returned by the fastener to preload the drive spring.

45. An adjustable bed as defined by claim 44 further including:

a damper between said frames for controlling lowering movement of said mattress frame.

46. An adjustable bed as defined by claim 45 wherein said drive means further comprises:

an elongated drive bar supported within said housing for reciprocating movement;

a release bar supported within said housing for reciprocating movement; and actuation means on said actuator shaft for shifting said drive bar and moving said drive plate when the shaft is rotated in the first direction and for shifting said release bar into engagement with the hold plate when said shaft is rotated in the second direction.

47. An adjustable bed as defined by claim 46 wherein said actuator means comprises:

a sector gear fixed to said actuator shaft; and a rack joined to said drive bar and engaged by said sector gear.

48. An adjustable bed as defined by claim 47 wherein said actuator means further includes a lobe on said sector gear positioned to engage said release bar.

49. An adjustable bed as defined by claim 48 wherein said drive plate and said hold plate each include offset, generally parallel portions joined by an angled portion, said apertures opening through said angled portion and partially through said offset portions.

50. An adjustable bed as defined by claim 48 wherein said lock plate comprises a first stack of a plurality of thin plates, each plate defining a generally circular aperture and each plate including inwardly angled lateral edge portions.

51. An adjustable bed as defined by claim 46 wherein said actuator means comprises:

a cam fixed to said shaft and defining a lobe and a rocker arm, said lobe positioned to engage said release bar, said rocker arm defining a plurality of teeth, said teeth dimensioned and positioned to engage a plurality of complimentary teeth on said drive bar.

52. An adjustable bed as defined by claim 51 wherein said drive plate and said hold plate each include offset, generally parallel portions joined by an angled portion, said apertures opening through said angled portion and partially through said offset portions.

53. An adjustable bed as defined by claim 51 wherein said lock plate comprises a first stack of a plurality of plates, each plate defining a generally circular aperture and each plate including inwardly angled lateral edge portions.

54. An adjustable bed as defined by claim 46 wherein said actuator means comprises:

a pair of cams having contacting, involute surfaces, one of said cams being pivoted to said housing and having a lobe engaging said drive bar, the other of said cams being fixed to said actuator shaft and having a lobe positioned to engage said release bar.

55. An adjustable bed as defined by claim 54 wherein said drive plate and said hold plate each include offset, generally parallel portions joined by an angled portion, said apertures opening through said angled portion and partially through said offset portions.

56. An adjustable bed as defined by claim 42 wherein said partition comprises:

a partition plate defining a bore; and wiper means received by said partition plate for wiping debris from the ram and lubricating the ram to prevent corrosion.

57. An adjustable bed as defined by claim 56 wherein said wiper means comprises:

an annular wick member, said member being saturated with a lubricant.

58. An adjustable bed as defined by claim 57 wherein said wiper means further includes:

a pair of annular seals sandwiching said wick member; and a sleeve engaging said partition plate and retaining said seals and wick member within said partition plate bore.

* * * * *